(12) United States Patent
Wang et al.

(10) Patent No.: US 7,529,410 B2
(45) Date of Patent: May 5, 2009

(54) LOCAL LOCALIZATION USING FAST IMAGE MATCH

(75) Inventors: Jian Wang, Beijing (CN); Yingnong Dang, Beijing (CN); Qiang Wang, Beijing (CN); Liyong Chen, Beijing (CN); Xiaoxu Ma, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 10/752,081

(22) Filed: Jan. 7, 2004

(65) Prior Publication Data

US 2005/0147281 A1    Jul. 7, 2005

(51) Int. Cl.
*G06K 9/46* (2006.01)
*G06K 9/62* (2006.01)
*G06F 3/033* (2006.01)
*G01B 7/00* (2006.01)

(52) U.S. Cl. .................. 382/216; 382/190; 345/179; 702/155

(58) Field of Classification Search ................ 382/190, 382/216
See application file for complete search history.

(56) References Cited

U.S. PATENT DOCUMENTS 5,577,135 A * 11/1996 Grajski et al. ............... 382/253

| | | | | |
|---|---|---|---|---|
| 5,698,822 A * | 12/1997 | Haneda et al. | ........... | 178/18.01 |
| 5,740,273 A * | 4/1998 | Parthasarathy et al. | ...... | 382/187 |
| 7,068,821 B2 * | 6/2006 | Matsutani | .................... | 382/119 |
| 2002/0000981 A1 * | 1/2002 | Hugosson et al. | ........... | 345/179 |
| 2002/0028017 A1 * | 3/2002 | Munich et al. | .............. | 382/187 |
| 2002/0126105 A1 * | 9/2002 | O'Donnell | ................... | 345/179 |
| 2002/0128796 A1 * | 9/2002 | Matsutani | .................... | 702/155 |
| 2002/0163511 A1 * | 11/2002 | Sekendur | .................... | 345/179 |

\* cited by examiner

*Primary Examiner*—Bhavesh M Mehta
*Assistant Examiner*—David P Rashid
(74) *Attorney, Agent, or Firm*—Birch, Stewart, Kolasch & Birch, LLP

(57) ABSTRACT

A technique is disclosed for determining a portion of a document corresponding to a captured image. A user employs a pen to create a stroke in a document, and images are captured by a camera mounted on the pen. The locations of some of the images are determined by, e.g., analyzing a pattern on the document captured by the image or by a pixel-by-pixel comparison of the image with the document. The locations of other images are determined by segmenting the sequence of images into groups corresponding to the shape of the stroke. Information relating to a located image in a segment is employed to determine the position of an unlocated image in the segment. This determined position is used for obtaining further information that may be used to determine the position of another unlocated image in the segment, and so on, until the segment is finished.

17 Claims, 12 Drawing Sheets

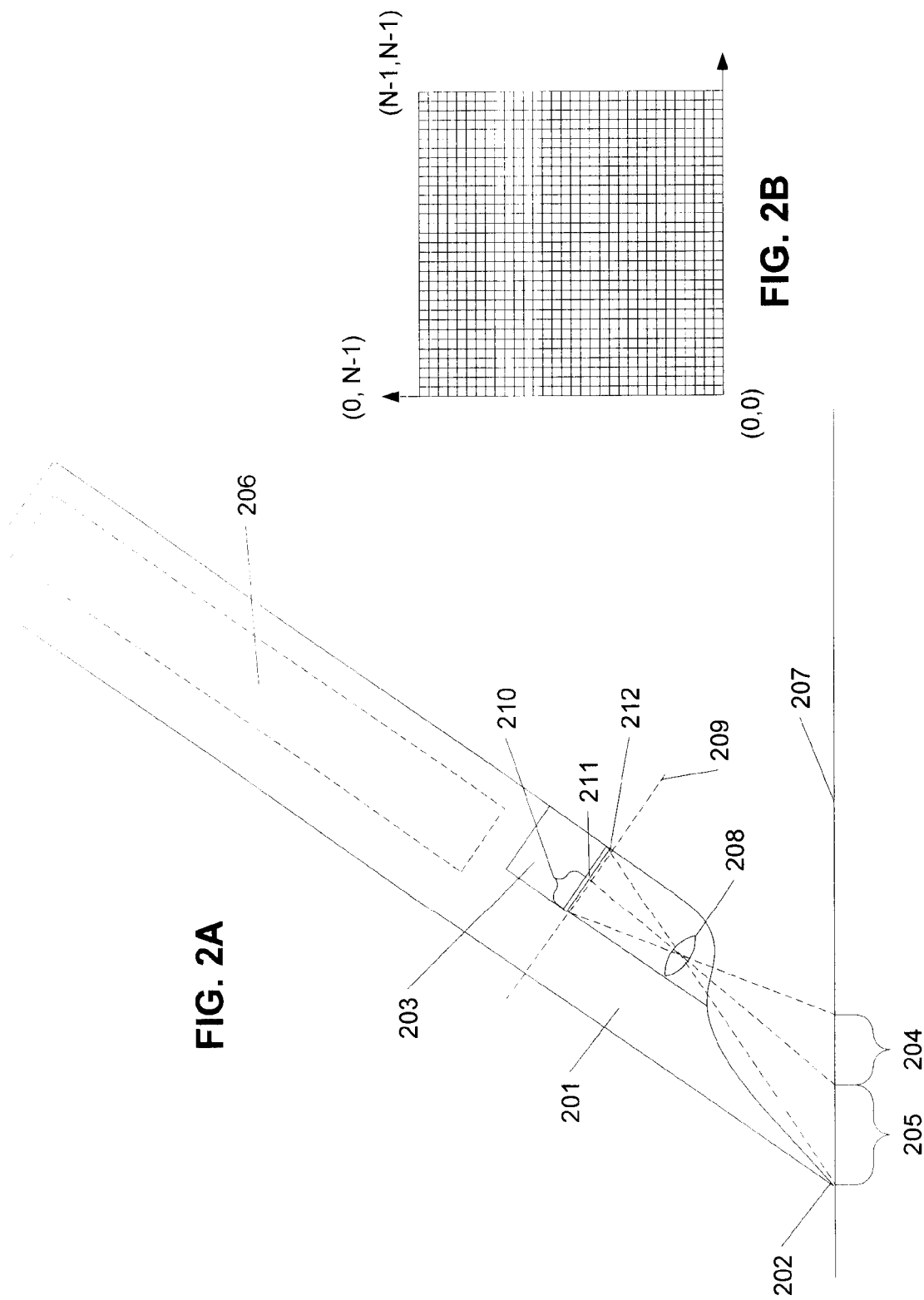

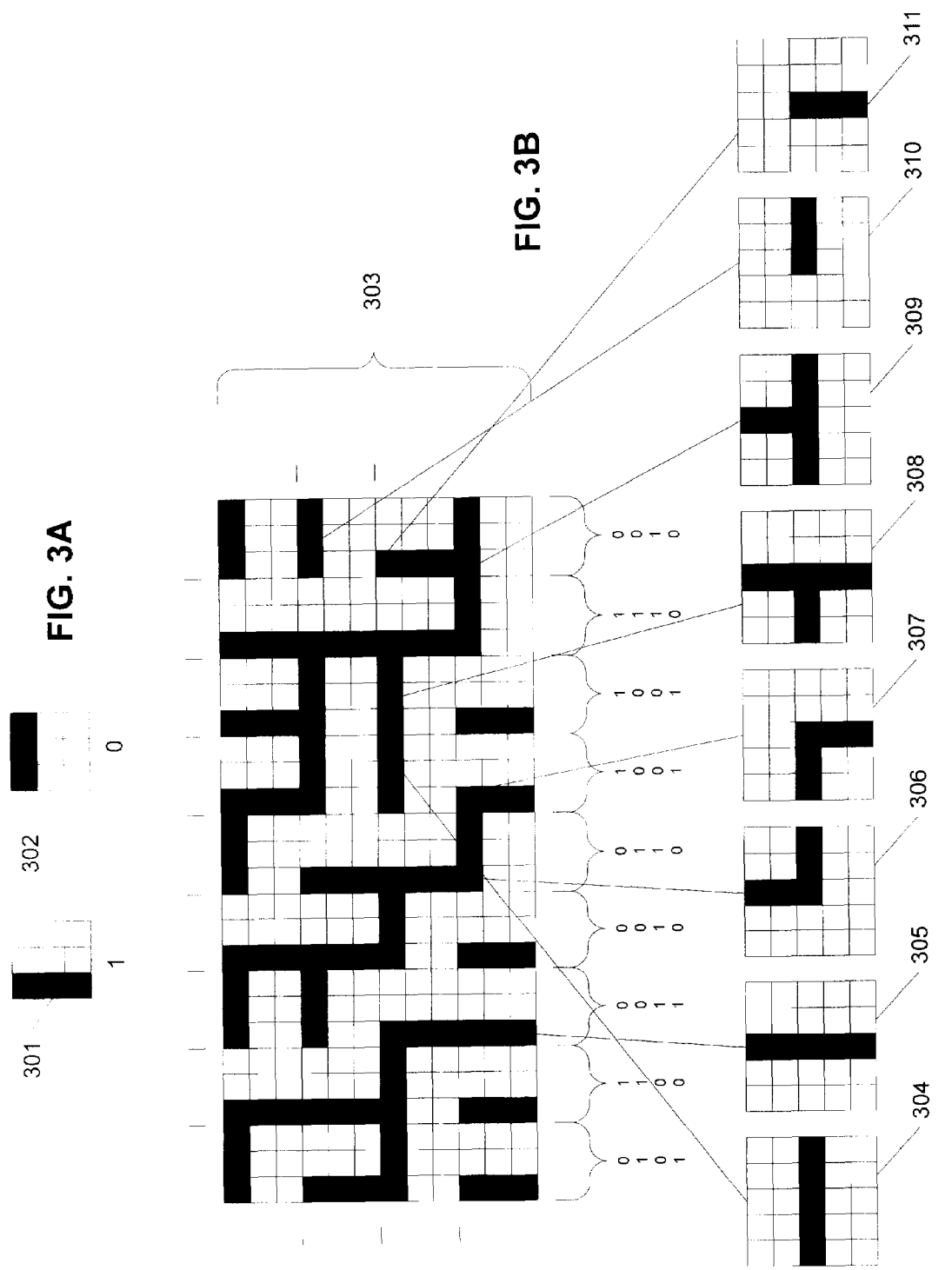

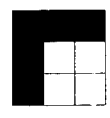
FIG. 3F  FIG. 3G  FIG. 3H  FIG. 3I
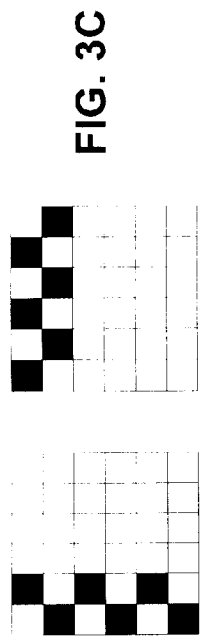
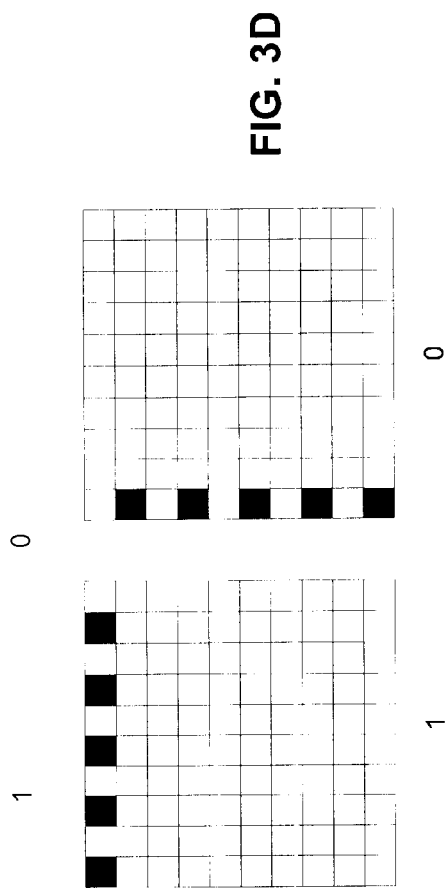
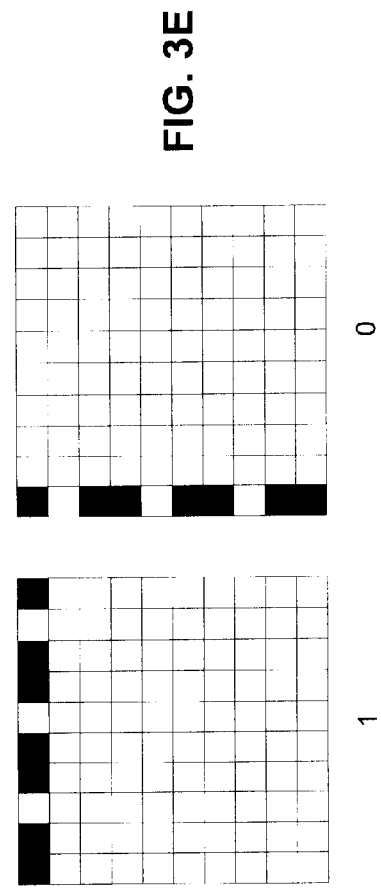
FIG. 3C  FIG. 3D  FIG. 3E $$o = \theta + \begin{cases} 0 - no\ a \\ \dfrac{\pi}{2} - no\ b \\ \pi - no\ c \\ \dfrac{3\pi}{2} - no\ d \end{cases}$$

1401

Warp

1301

Origin

LOCAL LOCALIZATION USING FAST IMAGE MATCH

FIELD OF THE INVENTION

The present invention relates to determining the location of a portion of a document captured in an image. Various aspects of the present invention are particularly applicable to identifying the location of marks on a document by capturing images of the document.

BACKGROUND OF THE INVENTION

While electronic documents stored on computers provide a number of advantages over written documents, many users continue to perform some tasks with printed versions of electronic documents. These tasks include, for example, reading and annotating the documents. With annotations, the paper version of the document assumes particular significance because the annotations typically are written directly onto the printed document by the user. One of the problems, however, with directly annotating a printed version of a document is the difficulty in later converting the annotations into electronic form. Ideally, electronically stored annotations should correspond with the electronic version of the document in the same way that the handwritten annotations correspond with the paper version of the document.

This correspondence usually requires the original or another user to wade through the annotations and personally enter them into a computer. In some cases, a user may electronically scan the annotations written on the paper document, thereby creating a new electronic document. These multiple steps make reconciliation between the printed version of a document and the electronic version of the document difficult to handle on a repeated basis. Further, scanned images frequently cannot be edited. Thus, there may be no way to separate the annotations from the original text of the document. This makes using the annotations difficult.

To address this problem, pens have been developed to capture annotations written onto printed documents with the pen. This type of pen includes a camera, which captures images of the printed document as a user writes annotations. With some examples of this type of pen, however, the pen may employ ink that is invisible to the camera. The pen may, for example, employ non-carbon ink and infrared illumination for the camera, which prevents the camera from "seeing" annotation written with the ink. With this type of pen, the pen infers the movement of the pen tip forming the annotations on the document from the images captured by the pen during the writing of the annotations. In order to associate the images with the original electronic document, however, the position of the images relative to the document must be determined. Accordingly, this type of pen often is employed with paper that includes a pattern that uniquely identifies different locations on the paper. By analyzing this pattern, the computer receiving an image can determine what portion of the paper (and thus what portion of the printed document) was captured in the image.

While the use of such patterned paper or other media allows written annotations on a paper document to be converted into electronic form and properly associated with the electronic version of the document, this technique is not always reliable. For example, a document containing text on the paper may obscure areas of the pattern. If the pen captures an image of one of these areas, then the computer may not be able to use the pattern to accurately determine the location of the document portion captured by the image. Instead, the computer must employ an alternate technique to identify the location of the document portion captured in the image. For example, the computer may perform a pixel-by pixel comparison of the captured image with the electronic document.

A pixel-by-pixel comparison will usually identify the portion of document in a captured image, but this technique has a high processing overhead. To perform this technique, for example, a transform of, e.g. rotation, and scale, between the captured image and the document image typically must first be estimated so that the captured image can be warped and matched with the document image pixel-by-pixel. If the transform is unknown, all possible rotations and scales must be considered. Additionally, a reference pixel in the image is selected. Every pixel in the warped image then is compared with a corresponding pixel in the electronic document such that the image reference pixel is compared to a first location in the electronic document. This comparison must then be repeated so that the reference pixel is eventually compared to each location in the electronic document. The comparison with the highest correspondence between the image pixels and the electronic document identifies the position of the reference pixel relative to the electronic document, and thus the portion of the document captured in the image. Accordingly, it would be desirable to provide a technique that allows a computer to determine the location of a portion of a document in a captured image without having to perform a pixel-by-pixel comparison of the image with the entire document.

BRIEF SUMMARY OF THE INVENTION

Advantageously, various embodiments of the invention provide an efficient technique for determining a portion of a document corresponding to a captured image. According to various embodiments of the invention, when a user employs a pen to create a stroke in a document, a camera mounted on the pen captures a series of images. The position of some of the images will be determined from, for example, an analysis of a pattern on the document that is captured by the image or a pixel-by-pixel comparison of the image with the document. The position of other images, however, will need to be determined using other techniques.

In order to efficiently determine the position of these unlocated images, the entire sequence of images is segmented into groups that correspond to the shape of the stroke. In this manner, images that correspond to a relatively linear section of a stroke will be grouped together. Also, because all of the images in a segment will typically be close, information relating to located images in a segment can be employed to determine the position of unlocated images in the segment. For example, a document search region for an unlocated image can be established based upon the position of a previous located image and a maximum or actual velocity of the pen. In addition, the rotation and scale of the located image (an affine transform that can be further refined as a perspective transform) can be used as an estimate of the rotation and scale of the unlocated image because the pen pose is not expected to change greatly in a short amount of time. This estimated rotation and scale can be used to warp the unlocated image to match the orientation and scale of the document image. A pixel-by-pixel comparison can then be made between the warped unlocated image and the document search region.

BRIEF DESCRIPTION OF THE DRAWINGS

FIG. 2A illustrates an example of a pen according to various embodiments of the invention, while FIG. 2B illustrates the resolution of an image that may be obtained by various embodiments of the invention.

FIGS. 3A through 3I show various examples of encoding systems in accordance with embodiments of the present invention FIG. 4 graphically illustrates how an encoding pattern can be employed to determine a rotation of an image captured from a portion of a document.

DETAILED DESCRIPTION OF THE INVENTION

Operating Environment

Figure 1:
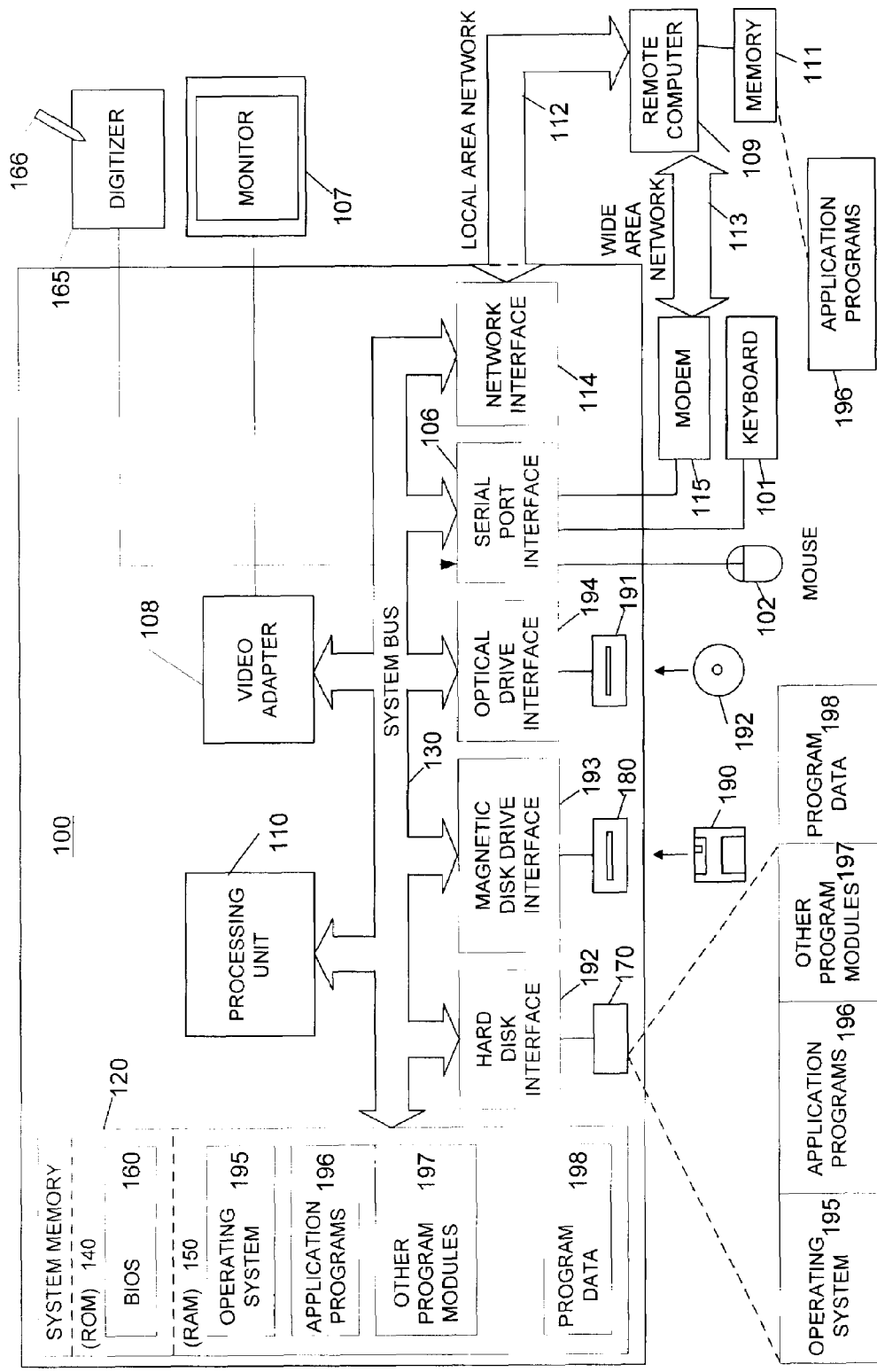
FIG. 1 shows a general description of a computer that may be used in conjunction with embodiments of the present invention.

FIG. 1 shows a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Device

Various embodiments of the invention may be employed to determine the locations of portions of a document captured by a series of images. As noted above, the determination of the location of a portion of a document captured in an image may be used to ascertain the location of a user's interaction with paper, a display screen, or other medium displaying the document. According to some embodiments of the invention, the images may be obtained by an ink pen used to write ink on paper. With other embodiments of the invention, the pen may be a stylus used to "write" electronic ink on the surface of a digitizer displaying the document.

FIGS. 2A and 2B show an illustrative example of a pen 201 that may be employed according to various embodiments of the invention. The pen 201 includes a tip 202 and a camera 203. The tip 202 that may or may not include an ink reservoir. The camera 203 captures an image 204 from surface 207. The pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by the camera 203. In one illustrative example, the resolution of an image captured by the camera 203 is N×N pixels (where N=32). Accordingly, FIG. 2B shows an example image 32 pixels long by 32 pixels wide. The size of N is adjustable, where a higher value of N will provide a higher image resolution. Also, while the image captured by the camera 203 is shown as a square for illustrative purposes here, the field of view of the camera may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement. Also, it should be appreciated that the image captured by camera 203 may be used directly by the processing system or may undergo pre-filtering. This pre-filtering may occur in pen 201 or may occur outside of pen 201 (for example, in a personal computer).

FIG. 2A also shows the image plane 209 on which an image 210 of the pattern from location 204 is formed. As shown in FIG. 2A, there is a distance 205 between location 204 and the pen tip 202. Light received from the pattern on the object plane 207 is focused by lens 208. According to various embodiments of the invention, the lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 will be referred to as the virtual pen tip. It should be noted that the virtual pen tip location with respect to image sensor 211 is fixed because of the constant relationship between the pen tip, the lens 208, and the image sensor 211.

As previously noted, the pen 201 will typically be used with a medium, such as a document printed on paper, the displays a pattern for identifying positions on the medium. Advantageously, this pattern may be used to transform the image 210 captured by the camera 203 into a form corresponding to the appearance of the medium. For example, the following transformation $F_{S \rightarrow P}$ transforms the image 210 captured by the camera 203 to a real image on a piece of paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \rightarrow P}$ may be estimated as an affine transformation. This simplifies as:

$$F'_{S \rightarrow P} = \left\{ \begin{array}{ccc} \frac{s_x \sin\theta_y}{\cos\theta_x \sin\theta_y - \cos\theta_y \sin\theta_x}, & -\frac{s_x \cos\theta_y}{\cos\theta_x \sin\theta_y - \cos\theta_y \sin\theta_x}, & 0 \\ -\frac{s_y \sin\theta_x}{\cos\theta_x \sin\theta_y - \cos\theta_y \sin\theta_x}, & \frac{s_y \sin\theta_x}{\cos\theta_x \sin\theta_y - \cos\theta_y \sin\theta_x}, & 0 \\ 0, & 0, & 1 \end{array} \right\}$$

as the estimation of $F_{S \rightarrow P}$, in which $\theta_x$, $\theta_y$, $s_x$ and $s_y$ are the rotation and scale of two orientations of the pattern captured at location 204. Further, one can refine $F'_{S \rightarrow P}$ by matching the captured image with the corresponding real image on paper. "Refine" means to get a more precise estimation of the transformation $F_{S \rightarrow P}$ by a kind of optimization algorithm referred to as a recursive method. The recursive method treats the matrix $F'_{S \rightarrow P}$ as the initial value. The refined estimation describes the transformation between S and P more precisely.

The location of the virtual pen tip can be determined with still further precision by calibration. In order to calibrate the location of the virtual pen tip, the user places the pen tip 202 on a fixed location $L_{pentip}$ on paper. Next, the user tilts the pen, allowing the camera 203 to capture a series of images with different pen poses. For each image captured, the transformation $F_{S \rightarrow P}$ is obtained. From this transformation, one can obtain the location of the virtual pen tip $L_{virtual-pentip}$:

$$L_{virtual-pentip} = F_{P \rightarrow S}(L_{pentip})$$

where $L_{pentip}$ is initialized as (0, 0) and $$F_{P \rightarrow S} = (F_{S \rightarrow P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

Pattern for Identifying Positions on a Medium

As previously noted, various embodiment of the invention are employed to determine the portion of a document corresponding to a captured image, where the medium displaying the document also includes a pattern for identifying different positions on the medium. Thus, the pattern may be considered to be an encoded data stream in a displayed form. The medium displaying the pattern may be printed paper (or other physical medium), or it alternately may be a display projecting the encoded data stream in conjunction with another image or set of images. For example, the encoded data stream may be represented as a physical image on the paper or an image overlying the displayed image, or it may be a physical encoded pattern (i.e., a non-modifiable pattern) combined with or overlaying a display screen (so that any image portion captured by a pen is locatable on the display screen).

FIG. 3A shows one example of encoding techniques for encoding a first bit and a second bit into a pattern for identifying positions on a medium. A first bit 301 (for example, with a value of "1") is represented by column of dark ink. A second bit 302 (with, for example, a value of "0") is represented by a row of dark ink. It should be appreciated, however, that any color ink may be used to represent the various bits. The only requirement in the color of the ink chosen is that it provides a significant contrast with the background of the medium to be differentiable by an image capturing system. In this example, the bits in FIG. 3A are represented by a 3×3 matrix of dots. The size of the matrix may be modified to be any desired size, based upon the size and resolution of the image capture system being used to capture images of the medium.

Alternative representations of bits with 0 and 1 values are shown in FIGS. 3C-3E. It should be appreciated that the representation of a one or a zero for the sample encodings of FIGS. 3A-3E may be switched without effect. FIG. 3C shows bit representations occupying two rows or columns in an interleaved arrangement. FIG. 3D shows an alternative arrangement of the pixels in rows and columns in a dashed form. Finally FIG. 3E show pixel representations in columns and rows in an irregular spacing format (e.g., two dark dots followed by a blank dot).

It should be noted that alternative grid alignments are possible, including a rotation of the underlying grid to a non-horizontal and non-vertical arrangement (for example, where the correct orientation of the pattern is 45 degrees). Using a non-horizontal and vertical arrangement may provide the probable benefit of eliminating visual distractions from the user, as users may tend to notice horizontal and vertical patterns before others. For purposes of simplicity, however, the orientation of the grid (horizontal, vertical and any other desired rotation of the underlying grid) is referred to collectively as the predefined grid orientation.

Referring back to FIG. 3A, if a bit is represented by a 3 by 3 matrix of elements and an imaging system detects a dark row and two white rows in a 3×3 region, then that region is detected a value of zero (or alternately a value of one). If a 3×3 region is detected with dark column and two white columns, then that region is detected a value of one (or, alternately, a value of zero). Accordingly, if the size of the image 210 in FIG. 2B is 32×32 pixels and each encoding unit size is 3×3 pixels, then the number of captured encoded units should be approximately 100 units. If the encoding unit size is 5×5, then the number of captured encoded units should be approximately 36.

As shown in FIG. 3A, more than one pixel or dot may be used to represent a bit. Using a single pixel (or dot) to represent a bit is fragile. Dust, creases in paper, non-planar surfaces, and the like create difficulties in reading single-element representations of data units. Even with the use of multiple elements to represent bits, however, other text displayed on the medium with the pattern, such as typewritten text in a document, may still obscure one or more bits in the pattern.

A bit stream is used to create the graphical pattern 303 of FIG. 3B. Graphical pattern 303 includes 12 rows and 27 columns. More particularly, the rows and columns are formed by a bit stream being converted into the graphical pattern 303 using bit representations 301 and 302. Thus, the pattern 303 of FIG. 3B may be viewed as having the following bit representation:

$$\begin{bmatrix} 0 & 1 & 0 & 0 & 0 & 1 & 1 & 1 & 0 \\ 1 & 1 & 0 & 0 & 1 & 0 & 0 & 1 & 0 \\ 0 & 0 & 1 & 1 & 1 & 0 & 0 & 1 & 1 \\ 1 & 0 & 1 & 0 & 0 & 1 & 1 & 0 & 0 \end{bmatrix}$$

Various bit streams may be used to create the image 303 shown in FIG. 3B. For example, a random or pseudo-random sequence of ones and zeros may be used. The bit sequence may be arranged in rows, in columns, diagonally, or following any other formulaic ordering. For example, the above matrix may be formed by the following bit stream if run left to right then down:

0100 0111 0110 0100 1000 1110 0111 0100 1100.

The above matrix may be formed by the following bit stream if run top to bottom then right:

0101 1100 0011 0010 0110 1001 1001 1110 0010.

The above matrix may represent the following bit stream if run diagonally then wrapped:

0110 0000 0101 0101 1000 0011 1111 1010 1010.

FIG. 3B also includes enlargements of pixel blocks from image 303. The enlargements 304-311 show 5×5 pixel blocks. Pixel block 304 shows a dark row between white rows. Pixel block 305 shows a dark column between white columns. Pixel block 306 shows a bottom left corner. Pixel block 307 shows a top right corner. The pixel block 308 shows a dark column with half a dark row on the left. Pixel block 309 shows a dark row with half a dark column above the row. The pixel block 310 shows half a dark row. Pixel block 311 shows half a dark column. Analyzing the combination of pixel blocks, it should be appreciated that all combinations of pixels may be formed by the image segments found in pixel blocks 304-311. The type of pattern shown in FIG. 3B may be referred to as a "maze" pattern, as the line segments appear to form a maze with no area being completely enclosed on all four sides by the maze.

Without more, it would be expected that each of the four "corner" combinations of pixels shown in FIGS. 3F-3I would be found in the maze pattern shown in the image 303. However, as seen in FIG. 3B, only three types of corners actually exist in the eight pixel blocks 304-311. In this example, there is no corner combination of pixels as shown in FIG. 3F. By choosing the image segments 301 and 302 to eliminate a type of corner in this manner, the orientation of a captured image based on the missing type of corner can be determined.

Figures 4, 5:
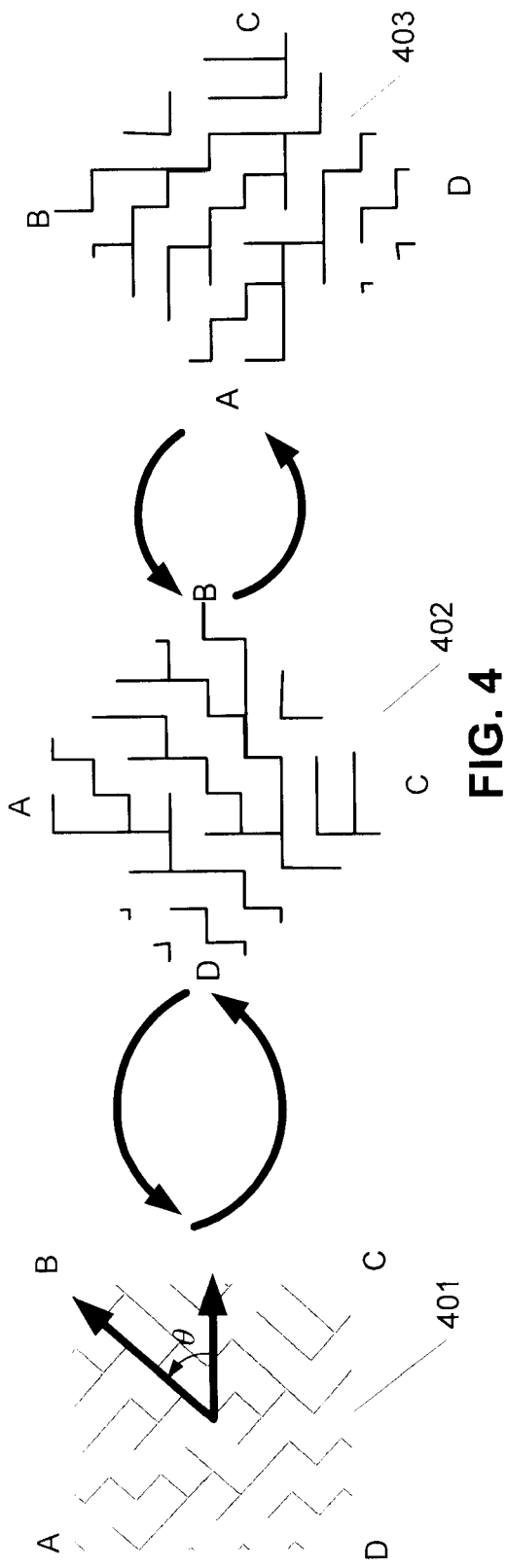
FIG. 5 illustrates a formula that may be used to determine a rotation of an image captured from a portion of a document.

For example, as shown in FIG. 4, the image 401 as captured by a camera 203 may be analyzed and its orientation determined so as to be interpretable as to the position actually represented by the image 401. First, image 401 is reviewed to determine which pixels of the image 401 form the maze pattern, and the angle θ needed to rotate the image so that the pixels of the pattern are horizontally and vertically aligned. It should be noted that, as discussed above, alternative grid alignments are possible with different embodiments of the invention, including a rotation of the underlying grid to a non-horizontal and non-vertical arrangement (for example, where the correct orientation of the pattern is 45 degrees).

Next, image 401 is analyzed to determine which corner is missing. The rotation amount o needed to rotate image 401 to an image ready for decoding 403 is shown as o=(θ plus a rotation amount {defined by which corner missing}). The rotation amount is shown by the equation in FIG. 5. Referring back to FIG. 4, angle θ is first determined by the layout of the pixels to arrive at a horizontal and vertical (or other predefined grid orientation) arrangement of the pixels and the image is rotated as shown in 402. An analysis is then conducted to determine the missing corner and the image 402 rotated to the image 403 to set up the image for decoding. Here, the image 402 is rotated 90 degrees counterclockwise so that image 403 has the correct orientation and can be used for decoding.

It should be appreciated that the rotation angle θ may be applied before or after rotation of the image 401 to account for the missing corner. It should also be appreciated that considering noise in the captured image, all four types of corners may be present. Accordingly, with various embodiments of the invention, the number of corners of each type may be counted, and the type that has the least number of corners may be determined to be the corner type that is missing.

Finally, the code in image 403 is read out and correlated with the original bit stream used to create image 303. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

From the foregoing, it will be appreciated that the maze pattern described above may be used to encode information onto the surface of a medium, such as a piece of paper or a display of a digitizer. This information can then be captured in one or more images by the camera 203 of the pen 201, and decoded. One particularly useful type of information that may be encoded onto the surface of a medium is position information. If portions of the bit stream are not repeated on the medium, then a computer 101 can determine the portion of a document that contains a particular bit stream.

If the complete portion of the pattern is captured in an image, then a computer 101 will be able to determine the portion of the document captured in the image, as described above. In some circumstances, however, a portion of the pattern may be obscured. For example, if the medium is a document containing, e.g., typewritten text, then the text may partially obscure one or more bits in the pattern. With the above example (where each bit is made up of a 3×3 matrix of pixels and the resolution of the camera 203 is 32×32 pixels), the computer 101 will very likely be able to determine the position of a document portion captured in an image if 60 or more bits can be identified from the image. If, however, only 36 to 60 bits can be identified in the image, then the computer 101 may still be able to determine the position of the document portion captured in the image. Still further, if only 35 or fewer bits can be identified from the image, then the computer 101 will not be able to determine the portion of the document captured in the image.

Images Captured with a Stroke

Figure 6:
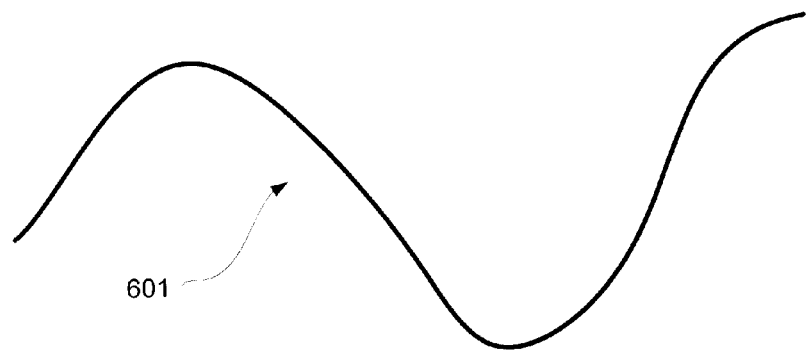
FIG. 6 illustrates a stroke made in a document.
Figure 7:
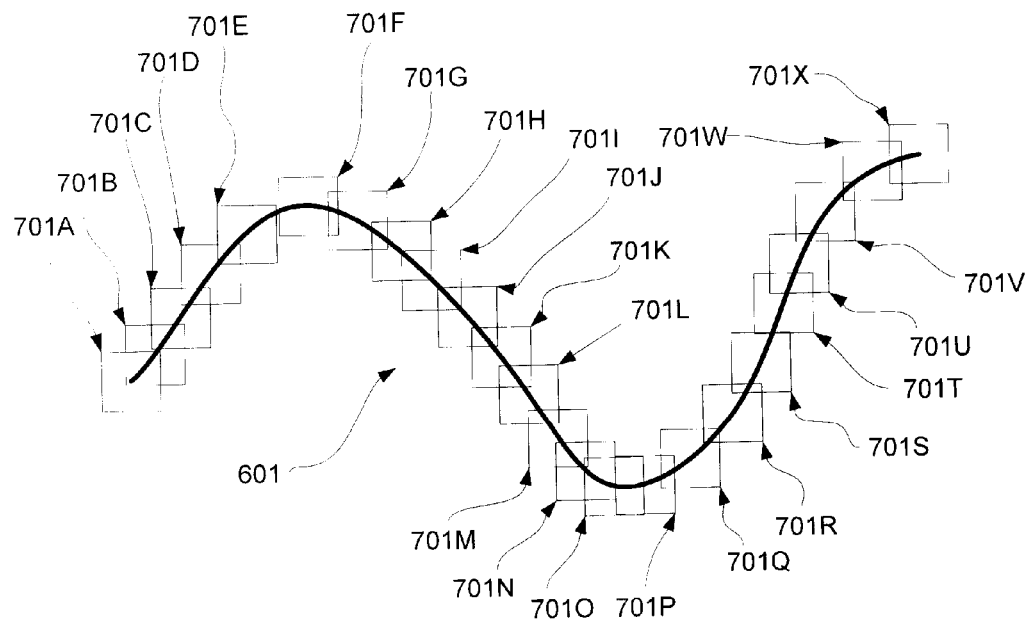
FIG. 7 illustrates captured images as the stroke is made in a document shown in FIG. 6.
Figure 8:
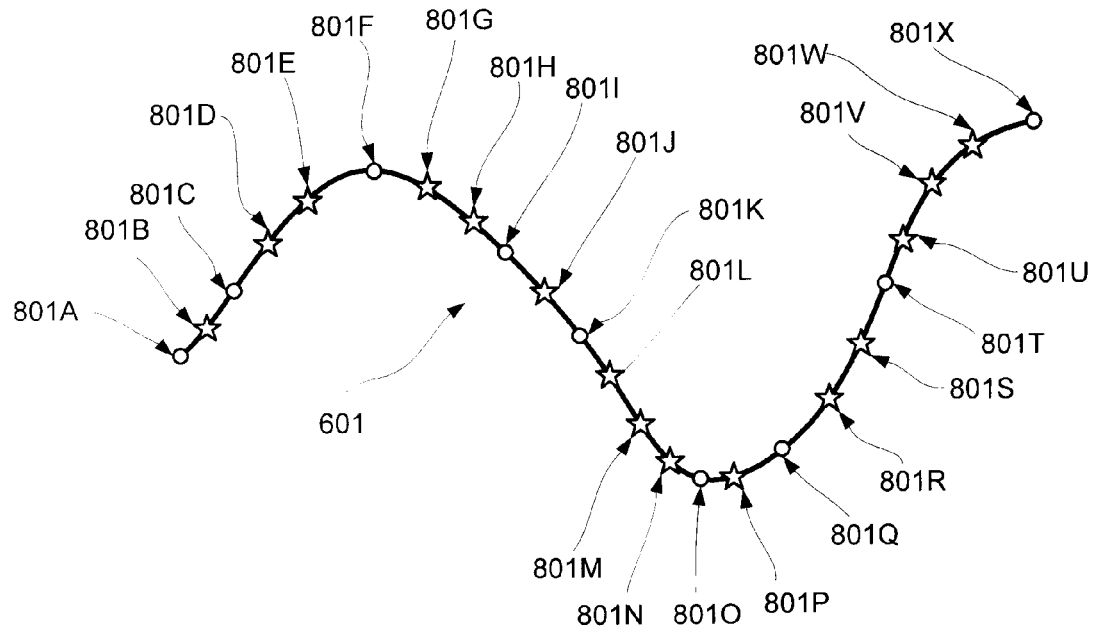
FIG. 8 illustrates reference points for each captured image shown in FIG. 7.

With the illustrated embodiment of the invention, ink forming a stroke on a document in invisible to the camera 203, as described in detail above. Instead, the camera 203 only captures images of the document as the pen moves to form a stroke. The position of the real pen tip, and thus the position of the stroke, is inferred by offsetting the position of the center of the images with a calibration parameter. Accordingly, FIG. 6 illustrates an example of a stroke path 601 corresponding to a stroke that may be formed on a document using the pen 201. The stroke path 601 follows the shape of the stroke, but is at an offset from the stroke. As the user moves the pen 201 to form the stroke, the camera 203 periodically captures an image of the document along the stroke path 601. Accordingly, as shown in FIG. 7, the camera 203 will capture a series of images 701A-701X of the document, with the center of each image falling on the stroke path 601. The center of each image 701A-701X thus falls on the real stroke path 601. FIG. 8 thus illustrates a series of points 801A-801X, which are the centers of images 701A-701X, respectively. It should be appreciated, however, that other embodiments of the invention may employ different arrangement. For example, with alternate embodiments of the invention, the center of a captured image may correspond to the actual tip 202 of the pen 201.

As previously noted, the document will include a pattern containing bit information identifying various locations of the document. Accordingly, each image 701A-701X may include a portion of this pattern. In some instances, the captured image will include enough of the pattern for a computer, such as computer 101, to determine the location of the image (i.e., to determine the position of the portion of the document captured in the image). Alternately, the location of one or more of the images may be obtained by, for example, performing a pixel-by-pixel comparison of the image with the document or selected areas of the document.

On the other hand, as noted above, if an insufficient number of bits are identified from an image, then the computer 101 cannot determine which portion of the document was captured in the image. Instead, the computer 101 must employ an alternate technique to determine which portion of the document was captured in the image. If the document is stored in an electronic form, and if the rotation and scale of a captured image in relation to the document image can be estimated, then the computer 101 can perform a pixel-by-pixel comparison of every pixel in the rotated and scaled image with every location in the electronic document. This technique may require a great number of comparison processes. For example, one page of an electronic document may contain 1410×21019 pixels, so 2,889,090 (1410×2019) comparisons are needed. In addition, each comparison process compares a great number of pixels. For example, a captured image may contain 32×32 pixels, therefore, each comparison compares 1024 (32×32) pixels. Furthermore, if the rotation and scale of the captured image cannot be estimated, all possible rotations and scales have to be considered. This technique thus entails a great deal of processor overhead and is time-consuming. Instead, as will be discussed in more detail below, the computer 101 may more efficiently and quickly determine the location of an image by performing a local fast image match according to various embodiments of the invention.

Figure 9:
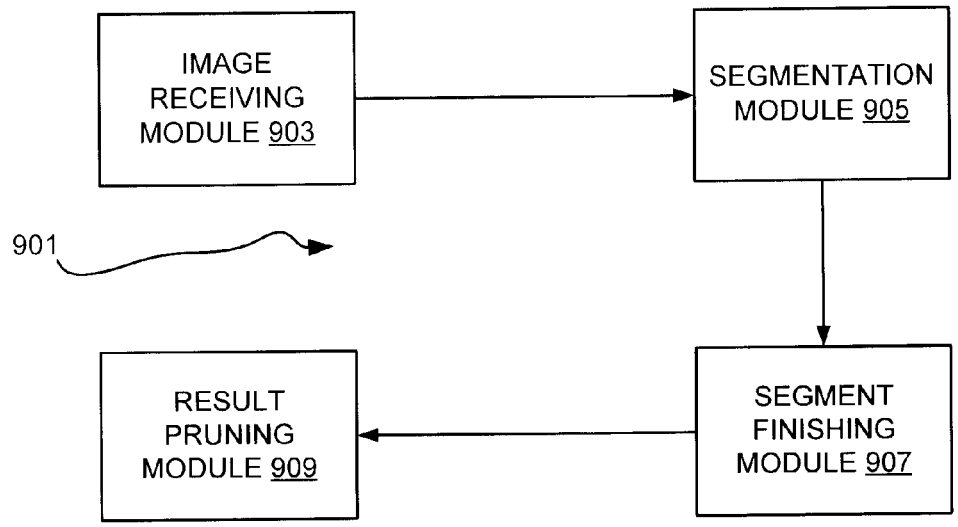
FIG. 9 illustrates a tool that may be used to match a captured image to a portion of a document according to various embodiments of the invention.

FIG. 9 illustrates a tool 901 that may be employed to perform a fast image match according to various embodiments of the invention. The tool 901 includes an image receiving module 903, a segmentation module 905, a segment finishing module 907, and result pruning module 909. As will be discussed in more detail below, the image receiving module 903 receives the images of a portion of a document displayed on a physical medium, with the center of each image falling the stroke path 601 at an offset from the actual ink stroke. The segmentation module 905 then analyzes each image, to segment the sequence of images corresponding to the shape of the stroke. Once the segments have been determined, the segment finishing module 907 "finishes" each segment by determining the location of each image in the segment. The result pruning module 909 then prunes location results that were erroneously determined by the segment finishing module 907. One method of determining the document portions corresponding to the unlocated images is described in the flowchart shown in FIGS. 10A-10C, which will also be described in more detail below.

Image Segmentation

When the images captured along the stroke path are analyzed, the computer 201 will first attempt to position each image using a pattern provided in the document, such as, e.g., a maze pattern as described in detail above. If no image can be successfully positioned by decoding the pattern, then a pixel-by-pixel comparison is made between the first image and the document (or, if probable corresponding areas of the document can be identified, with those probable corresponding areas). If the first image can be successfully located by such a comparison, then the rest of the frames are analyzed using the local localization process discussed in more detail below. If the first image cannot be successfully located, then the next frame is analyzed using a pixel-by-pixel comparison. This process continues until an image is successfully located, or until it is determined that none of the images can be located. If none of the images can be located, then the stroke is lost (i.e. the position of the stroke cannot be determined). The center of located images will hereafter be referred to as "start" points, as these points will be used as a baseline for determining the position of unlocated images along the stroke path 601. The center of each frame that is successfully located using the pattern or by pixel-by-pixel comparison is thus a start point.

Referring back now to FIG. 8, this figure shows various points 801A-801X, each of which is the center of an image 701A-701X, respectively. In this figure, points represented with a circle are start points. Thus, points 801A, 801C, 801F, 801I, 801K, 801O, 801Q, 801T, and 801X are start points. Points that are represented with a star are the center of images that have not yet been located (i.e., images that have captured an unidentified portion of the document). Points 801B, 801D, 801E, 801G, 801H, 801J, 801L, 801M, 801N, 801P, 801R, 801S, 801U, 801V, 801W, and 801X thus are unlocated points.

Figure 10A:
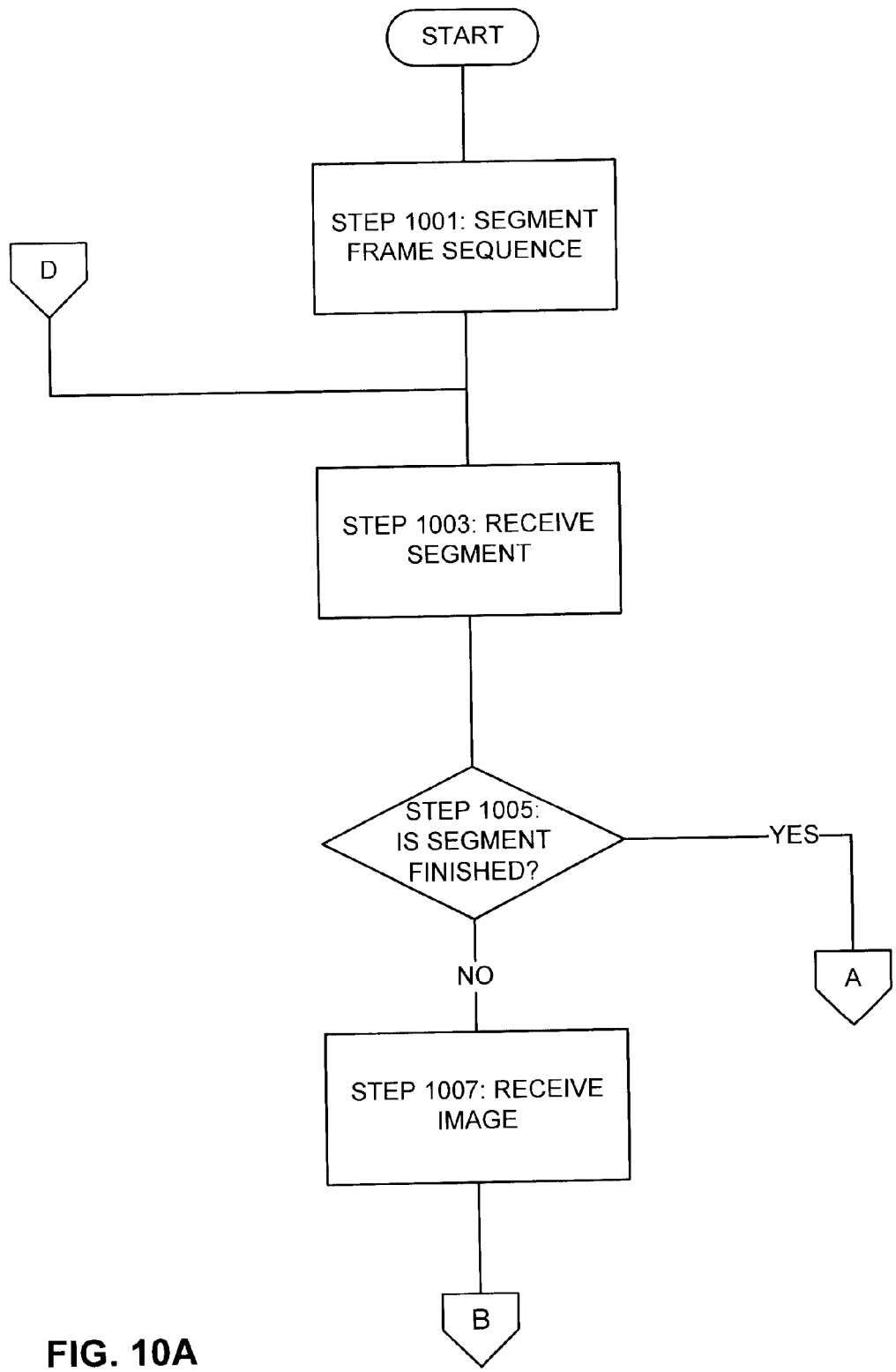
FIGS. 10A-10C illustrate a flowchart describing a method for matching a captured image to a portion of a document according to various embodiments of the invention.
Figure 10B:
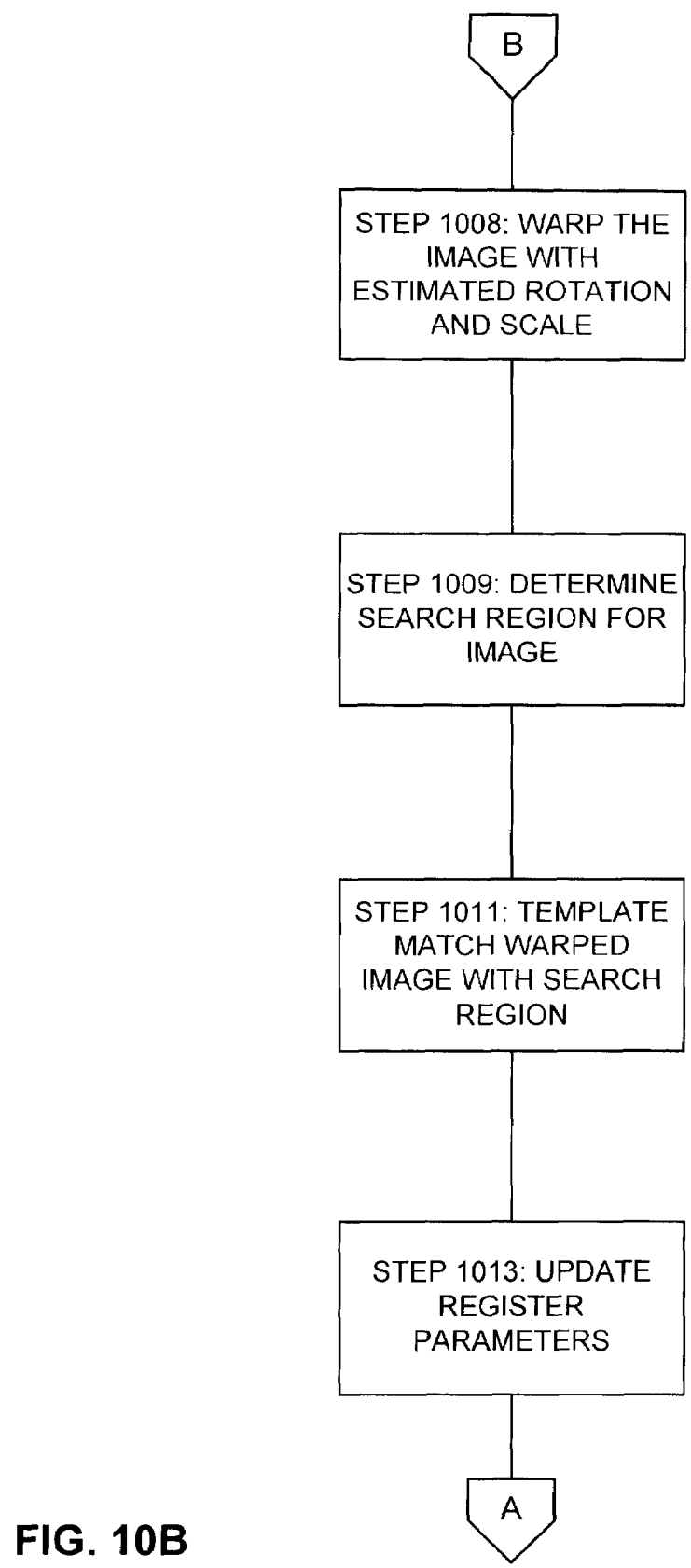
Figure 10C:
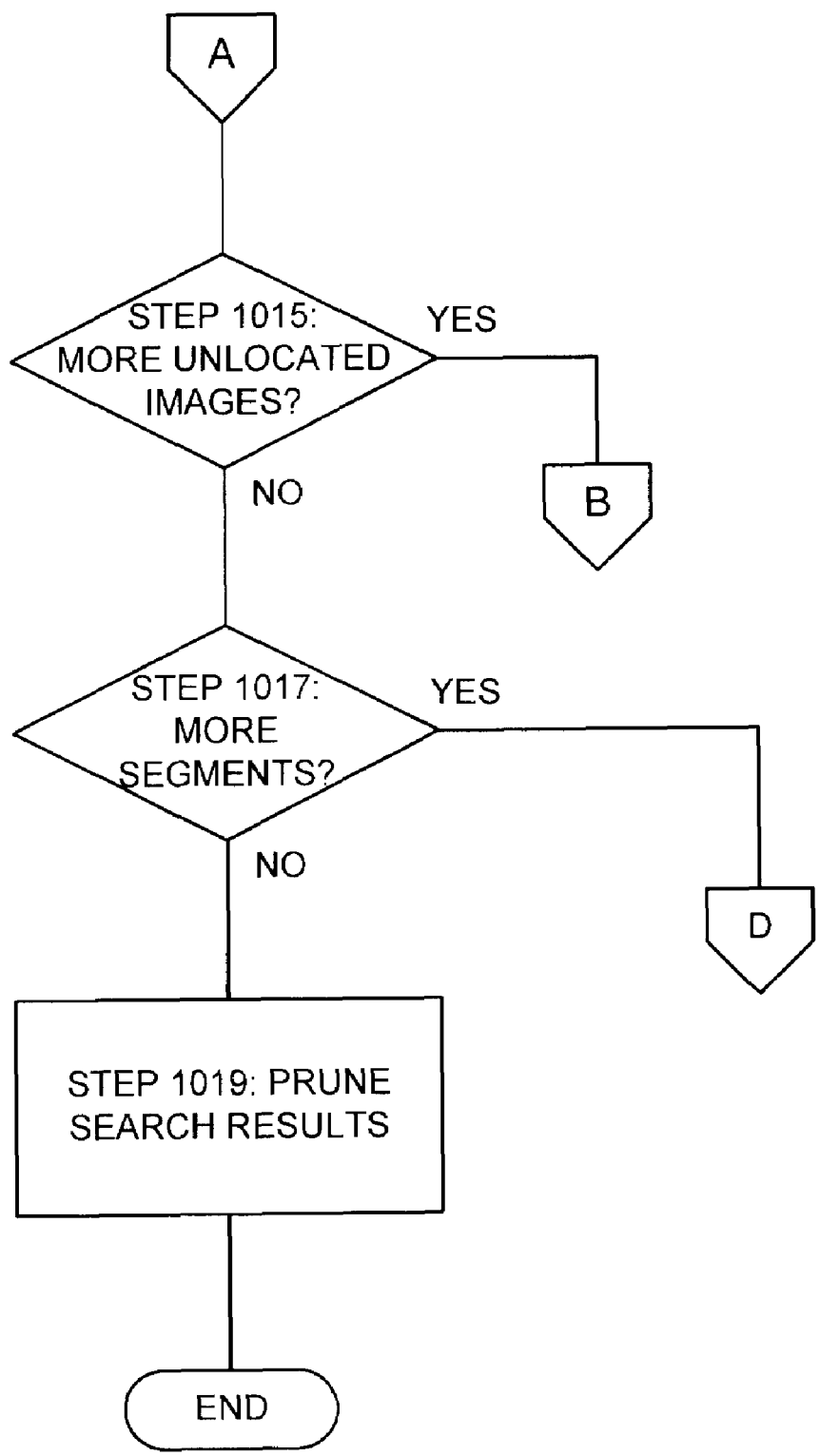

Turning now to FIG. 10A, in step 1001 the sequence of images (or frames) is segmented. More particularly, the sequence of images is divided up into groups, such that each group corresponds to a relatively linear portion of the stroke path 601. This segmentation allows the position of unlocated images in a segment to be accurately interpolated from the position of located images in that segment, as will be discussed in more detail below. In order to determine the segments for a stroke, the segmentation module 903 identifies pivotal start points for the stroke. Pivotal start points are points that occur on or near locations where the stroke changes direction. In addition, the first and last start points in a stroke will be considered pivotal start points.

Figure 11:
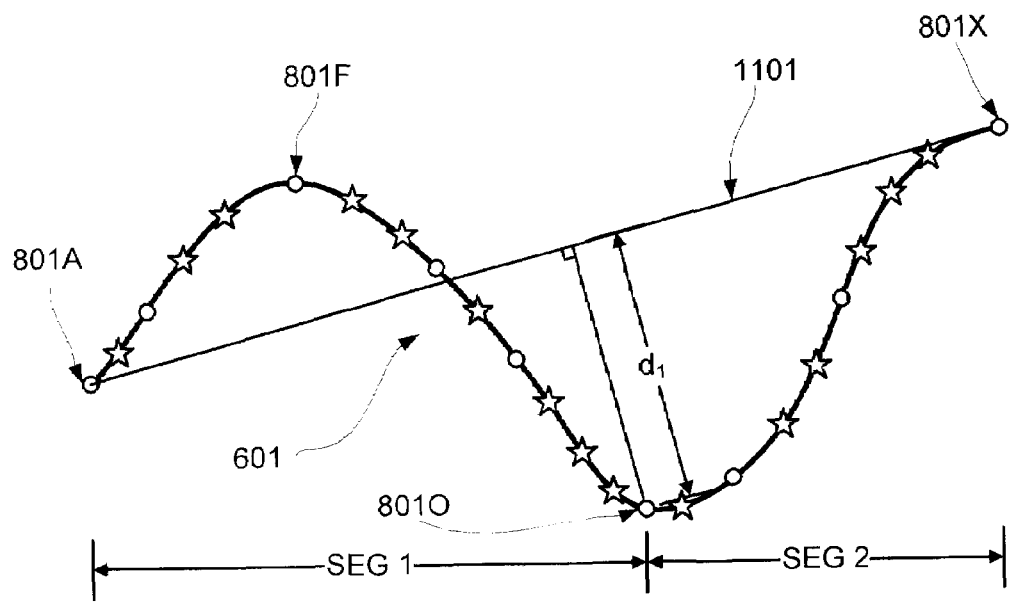
FIGS. 11 and 12 illustrate the determination of pivotal reference points for the stroke shown in FIG. 6.
Figure 12:
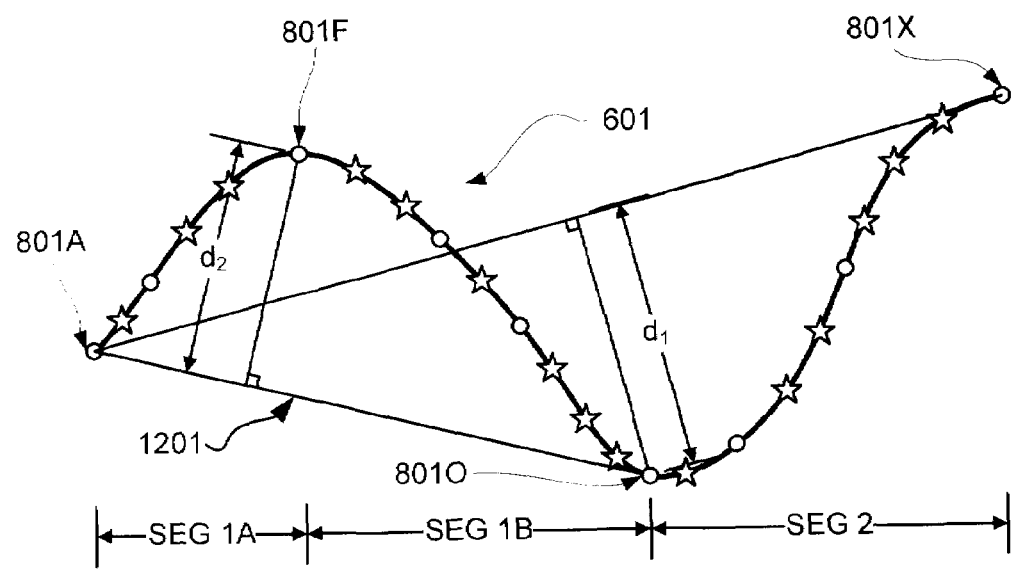

One process for segmenting the sequence of images 701A-701X for stroke path 601 is graphically illustrated in FIGS. 11 and 12. Both the first start point 801A and the last start point 801X are considered pivotal start points, as previously noted. The pivotal start points 801A and 801X thus define a single segment of the stroke path 601 between them. In order to determine additional pivotal start points for the stroke path point 601, the segmentation module 905 generates a line 1101 between the first pivotal start point 801A and the last start pivotal start point 801X, as shown in FIG. 11. The start point 801O that is farthest from the line 1101 (with the distance greater than a threshold value, such as 0.5 pixels, as will be described below) is then identified as a pivotal start point. Thus, the segmentation module 905 designates the start point 801O, located at a distance $d_1$ from the line 1101, as a pivotal start point. Defining the start point 801O divides the sequence of images 701A-701X into two segments. The first segment, SEG 1, corresponds to the portion of the stroke path 601 between the pivotal start point 801A and the pivotal start point 801O, and a second segment, SEG 2, corresponds to the portion of the stroke path 601 between the pivotal start point 801O and the pivotal start point 801X.

The segmentation module 905 continues to break up each segment into smaller segments, until each segment corresponds to a portion of a stroke that is relatively straight. For example, with the stroke path 601, the segmentation module 905 will divide the first segment SEG 1 into smaller segments. More particularly, the segmentation module will generate a line 1201 between the end points of the segment SEG 1 (i.e., between the pivotal start point 801A and the pivotal start point 801O. The segmentation module 903 then identifies the start point that is furthest from the line 1201. Thus, the segmentation module 905 designates the start point 801F, located at a distance $d_2$ from the line 1201, as a pivotal start point. Defining the start point 801F divides the segment of images 701A-701O into two segments. The first segment, SEG 1A, corresponds to the portion of the stroke path 601 between the pivotal start point 801A and the pivotal start point 801F, and a second segment, SEG 1B, corresponds to the portion of the stroke path 601 between the pivotal start point 801F and the pivotal start point 801O.

The segmentation module 905 continues to divide each segment of images until each segment of images corresponds to a portion of a stroke that is substantially linear. For example, if the segmentation module 905 generates a line between two pivotal start points forming a segment, and there are no start points more than a threshold distance from the line, then the segmentation module will not divide the segment further. With some embodiments of the invention, the threshold value may be, for example, a distance of 0.5 units (e.g. pixels) employed to define individual locations in the document (using, e.g., a Cartesian coordinate system). Of course, a higher threshold value may be used, thereby allowing segments of the images to correspond with portions of the stroke that are less linear. A lower threshold value also may be used, thereby requiring segments of the images to correspond with portions of the stroke that are more linear.

Once the segmentation module 905 has identified all of the pivotal start points in a stroke, it refines the position and the perspective transform for the pivotal start points. More particularly, the segmentation module 905 compares each image 701 corresponding to a pivotal start point 801 with an electronic version of the document, in order to more accurately determine the location and perspective transform of the pivotal start points 801. This comparison process may be employed using any desired known technique, such as, for example, a technique described in "Panoramic Image Mosaics," Microsoft Research Technical Report MSR-TR-97-23, by Heung-Yeung Shum and Richard Szeliski, published Sep. 1, 1997 and updated October 2001. Refining the pivotal start points completes the process of dividing the sequence of images into segments.

Figure 14:
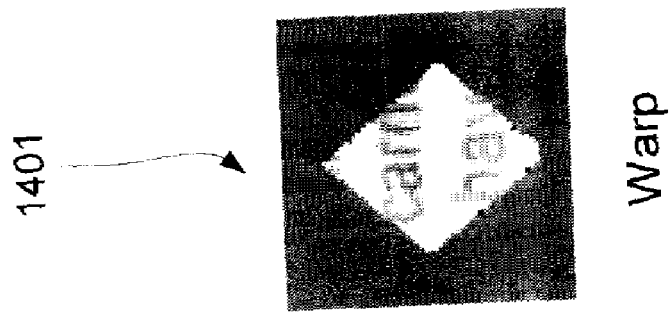
FIGS. 13 and 14 illustrate an example of how a captured image may be warped.
Figure 13:
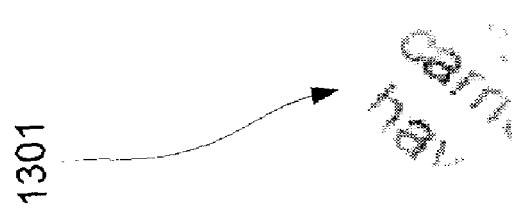

In addition to more accurately determining the position of the pivotal start points 801 (and their associated images 701), refining the pivotal start points 801 allows the segmentation module 903 to increase the accuracy of the transform parameters used to match the images with their corresponding portions of the document. As discussed in detail above, tilting and rotation of the pen 201 causes the images taken by the camera to be rotated and scaled relative to the actual appearance of the document. In order to accurately compare the image with a portion of the document, the image must be warped to compensate for the change in rotation and scale caused by the tilt and rotation of the pen 201. For example, FIG. 13 illustrates an original image 1301. FIG. 14 then illustrates the same image 1401 after it has been warped according to warping transform parameters.

By more accurately comparing the pivotal start points to the electronic version of the document, the segmentation module 905 can modify the transform parameters in order to more accurately warp an image to match the document. With various embodiments of the invention, the segmentation module 905 may modify a single set of transform parameters to be applied to all of the captured images in the sequence. With still other embodiments of the invention, however, the segmentation module 905 creates a specific set of transform parameters for each pivotal start point. As will be discussed in more detail below, having a specific set of transform parameters for each pivotal start point allows adjacent, unlocated points to be more accurately interpolated. While the tilt and rotation of the pen 201 may vary widely over the distance of an entire stroke, the tilt and rotation of the pen 201 typically will not vary much over the short distance of a single segment of the stroke. Accordingly, transform parameters for each pivotal start point can be used to more accurately warp images captured just before or just after the image corresponding to the pivotal start point.

After the segmentation module 905 segments the images 701A-701X, the segment finishing module 907 processes each segment of images to determine the position of unlocated images in each segment. Thus, in step 1003, the segment finishing module 907 receives the images in the first segment. Next, in step 1003, the segment finishing module 907 determines if the segment is finished. The segment finishing module 907 will determine that a segment is finished if the segment includes at least one start point that is not a pivotal start point. That is, if the position of at least one point in the segment, other than a pivotal start point, was previously determined from the pattern captured in the image or by another technique, then the segment is finished. In this circumstance, the segment is sufficiently linear that the location of all the images in the segment can be determined by linear interpolation. Additionally, the segment finishing module 907 will determine that a segment is finished after every unlocated image in the segment has been matched to a corresponding portion of the document.

If a segment is not finished, then in step 1007 the segment finishing module 907 receives the first unprocessed (i.e. unlocated) image in the segment. (The first image in each segment will be a pivotal start point, with a known position.) In step 1008, the segment finishing module warps the image for comparison with the document, as will be discussed in detail below. Then, in step 1009, the segment finishing module 907 determines a search region for the unprocessed image. The search region for the initial unprocessed image in a segment is determined based upon a maximum estimated velocity of the pen 201. As will be appreciated by those of ordinary skill in the art, a user writing with the pen 201 will only be able to move the pen 201 at a maximum speed accords a physical medium displaying the document. The maximum speed for a particular type of pen 201 and physical medium may be determined, by, e.g., experimentation.

The center of the search region for the first unprocessed image can thus be the first pivotal start point in the segment, with the radius of the search region being restricted to the maximum velocity for the pen 201 multiplied by the time interval between the capture of image corresponding to the first pivotal start point in the segment and the capture of the first unprocessed image in the segment. With various embodiments of the invention, the unprocessed image will be warped for the comparison using the transform parameters of the first pivotal start point in the segment, as previously noted. With still other embodiments of the invention, however, an unprocessed image may be warped for the comparison using the transform parameters of the previously located image in the segment, regardless of whether that previous image was a pivotal start point. After the unprocessed image has been warped, the segment finishing module 905 will then make a pixel-by-pixel comparison of the warped first unprocessed image with the search area of the document, to determine the portion of the document captured in the first unprocessed image. The pixel-by-pixel comparison may, for example, determine a correlation value between the first unprocessed image and each portion of the document in the search area.

The segment finishing module 907 will determine that the unprocessed image corresponds to the portion of the document producing the highest correlation value. By accurately locating the unprocessed image in the manner, the segment finishing module 907 will also determine the location of the point corresponding to the unprocessed image. The distance between the located point for the first unprocessed image and the first pivotal start point will indicate a speed at which the pen 201 was actually moved. Based upon the determined location of the unprocessed image, the segment finishing module 907 also can update the transform parameters by refining the captured images (i.e. by matching the captured image with the document image to obtain a perspective transform) for use in warping the next unprocessed image, as noted above. Once the actual movement speed for the pen 201 has been determined and the transform parameters have been updated, the unprocessed image will be considered processed.

In step 1015, the segment finishing module 907 determines if there are additional unprocessed images in the segment. If there are, then the segment finishing module 907 repeats step 1007 by receiving the current unprocessed image. Then, in step 1009, the segment finishing module 907 determines a search region for the current unprocessed image. With the second and each subsequent unprocessed image in a segment, the search area will be determined based upon the actual velocity of the pen 201 determined from locating the previous unprocessed image. For example, the center of the search region can be centered on the point corresponding to the previously unprocessed image. The segment finishing module 907 can then determine the radius of the search region based upon the actual pen velocity calculated from the location of the point for the previous unprocessed image. More particularly, the radius of the search region may be determined by multiplying the actual pen velocity calculated from the position of the previous unprocessed image by the time interval between captured images.

As will be appreciated by those of ordinary skill in the art, a user writing with the pen 201 will only be able to change the velocity of the pen 201 by a maximum acceleration value. This maximum acceleration value may be calculated, for example, by experiment, or may be based upon the actual acceleration between prior located images. Accordingly, with some embodiments of the invention the radius of the search region for the second and subsequent unprocessed images may be modified by the maximal acceleration value. For example, if there may be three images f1, f2, f3 in a stroke, which are captured at time t1, t2 and t3 and have centers at points p1, p2, and p3. If the location of points p1 and p2 can be determined, then the velocity V of the pen between the capture of these images is $V=(p2-p1)/(t2-t1)$. If the acceleration has a value between −A and A, then the search region for point p3 ill be centered around location P=p2+V*(t3−t2), with the area of the search region being [P−A*(t3−t2)*(t3−t2)/2, P+A*(t3−t2)*(t3−t2)/2].

Once the segment finishing module 907 has determined the search region for the current unprocessed image, the segment finishing module 907 warps the unprocessed image with the perspective transform from the previous processed image and performs a pixel-by-pixel comparison of the warped unprocessed image with the search region of the document in step 1011. Again, the portion of the document that produces the highest correlation value is selected as the location for the current unprocessed image. The segment finishing module 907 then calculates a new velocity for the pen 201 based upon the distance between the point for the current unprocessed image and the point for the previous unprocessed image. It also updates the transform parameters based upon the identified location of the current unprocessed image, thereby processing the image. The segment finishing module 907 then repeats step 1015, to determine if there are any remaining unlocated images in the current segment.

The segment finishing module 907 repeats steps 1007 and 1015 until there are no further unlocated images in the current segment. Next, in step 1017, the segment finishing module 907 determines if there are any more segments in the sequence of images. If there are more segments, then the segment finishing module 907 repeats steps 1003 to 1015 until all of the segments in the sequence of images have been finished.

After all of the segments are finished, each image in a stroke will be located in the document. Several factors, such as incorrect initial transform parameters and motion blur, or example, may lead to erroneous location results for one or more of the located images. Accordingly, various embodiments of the invention employ the result pruning module 909 to prune erroneous locations from the results in step 1019.

The result pruning module 909 may, for example, maintain the location of each of the start points for the sequence of images. Next, the result pruning module 909 can step through each point for the whole stroke path, analyzing each point in order from the first point to the last point. More particularly, the velocity from the previous point to the current point and from the current point to the next point is calculated. The acceleration is also calculated from the two velocity values. If either velocity value or the acceleration exceeds the maximum, then the location of the current point is deemed erroneous and pruned from the results.

With various embodiments of the invention, the result pruning module 909 may repeat the analysis of each point, but instead analyze each point in reverse order from the last point to the first point. Thus, the velocity from the next point to the current point and from the current point to the previous point is calculated. The acceleration is also calculated from the two velocity values. If either velocity value or the acceleration exceeds the maximum, then the location of the current point is deemed erroneous and pruned from the results. After all of the erroneous points have been pruned, the location of the pruned points may be determined using interpolation.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for determining positions of a plurality of images in a document on a physical medium, a pattern being displayed on the physical medium, the plurality images being sampled by a camera mounted to a pen or stylus while the pen or stylus is moved across the document such that the plurality of images track the movement of the pen or stylus while creating a stroke in the document, the method comprising:
    locating at least two images in the plurality of images by
        detecting a portion of the pattern that is captured in each of the at least two images, and
        analyzing the detected portions of the pattern in order to determine the positions in the document of the at least two images;
    segmenting the stroke into segments based on the located images;
    grouping the plurality of images, each group corresponding to one of the segments of the stroke such that each group comprises:
        two of the located images corresponding to start and end positions, respectively, of the corresponding segment, and
        at least one image in the plurality of images corresponding to at least one intermediate position of the corresponding segment;
    for each group, determining if the corresponding segment of the stroke is unfinished by determining whether the at least one intermediate position corresponds to at least one image whose position in the document has not previously been determined; and
    for each unfinished segment, using the determined position corresponding to at least one of the start and end positions to determine the position in the document of the at least one image whose position in the document has not previously been determined,
    wherein the document includes text obscuring a portion of the pattern before the pen or stylus is moved across the document, the obscured portion of the pattern being captured within the at least one image whose position in the document has not previously been determined of an unfinished segment.

2. The method according to claim 1, wherein each of the plurality of images is a multiple-pixel image.

3. A method for determining positions of a sequence of images in a document on a physical medium, a pattern being displayed on the physical medium, the sequence of images being sampled by a camera mounted to a pen or stylus while the pen or stylus is moved across the document, the method comprising:
    determining the positions of portions of the document captured in at least two images in the sequence of images based on a detected portion of the pattern in each of the at least two images;
    segmenting the sequence of images based on the at least two images which captured portions of the document whose positions have been determined by the determining step to produce a plurality of segments, each of the segments comprising:
        a start-position image, which is one of the images which captured portions of the document whose positions have been determined by the determining step, an end-position image, which is another of the images which captured portions of the document whose positions have been determined by the determining step, and at least one intermediate-position image, which has been sampled between the start-position and end-position images within the sequence of images;

identifying each of the plurality of segments which has an intermediate-position image which captured a portion of the document whose position could not be determined by the determining step; and for each identified segment, using the position of the portion of the document captured in at least one of the start-position image and the end-position image determined by the determining step to find the position of the portion of the document captured in the intermediate-position image whose position could not be determined by the determining step, wherein each image in the sequence of images is a multiple-pixel image.

4. The method recited in claim 3, further comprising:

for at least one identified segment, using the position of the portion of the document captured in at least one of the start-position image and the end-position image to determine the positions of portions of the document captured in a plurality of intermediate-position images whose positions in the documents cannot be determined by the determining step.

5. The method recited in claim 4, further comprising for a particular identified segment, determining a search area in the document based upon:

the movement of the pen or stylus in forming the stroke, and the position of the portion of the document captured in at least one of: the start-position image of the particular identified segment, the end-position image of the particular identified segment, and an intermediate-position image in the particular identified segment which captured a portion of the document whose position has already been determined or found, and finding the position of the portion of the document captured by another intermediate-position image in the particular identified segment by comparing the another intermediate-position image to the search area in the document.

6. The method recited in claim 5, wherein the search area is determined based on a determined maximum velocity of the pen.

7. The method recited in claim 5, wherein the search area is determined based on an actual velocity of the pen calculated from positions of portions of the document of two or more intermediate-position images in the particular identified segment which have already been determined or found.

8. The method recited in claim 5, wherein the search area is determined based on a determined maximum acceleration of the pen.

9. The method recited in claim 3, wherein each segment corresponds to a relatively linear portion of the stroke.

10. The method recited in claim 3, further comprising analyzing the determined and found positions of portions of the document captured in the sequence of images; and pruning one or more erroneous positions.

11. The method recited in claim 10, wherein the analyzing includes designating the positions of portions of the document determined as a result of the determining step as not being erroneous.

12. The method according to claim 3, wherein the stroke is segmented by:

finding images that correspond to the start-position and end-position images, respectively, of a particular segment of the stroke, of the intermediate-position images in the particular segment which have captured portions of the document whose positions have been determined by the determining step, choosing the one whose determined position is furthest from a line intersecting the determined positions of the portions of the document captured in the start-position image and the end-position image, respectively, of the particular segment;

dividing the particular segment into first and second segments by designating the start-position image and the chosen image of the particular segment as the start-position image and end-position image, respectively, of the first segment, and by designating the chosen image and the end-position image of the particular segment as the start-position image and the end-position image, respectively, of the second segment.

13. The method according to claim 3, wherein for each identified segment, the position in the document of the at least one of the start-position image and end-position image is used to find a search region in the document for performing pixel-by-pixel comparisons with the intermediate-position image whose position in the document cannot be determined by the determining step, and using the results of the pixel-by-pixel comparisons to find the position in the document of the intermediate-position image whose position in the document cannot be determined by the determining step.

14. The method according to claim 3, wherein the document includes text obscuring a portion of the pattern before the pen or stylus is moved across the document, the obscured portion of the pattern being captured within an intermediate-position image whose position in the document cannot be determined by the determining step.

15. A method for determining positions of a plurality of images in a document printed on paper watermarked by a maze pattern, the plurality images being sampled in sequence by a camera mounted to a pen or stylus while the pen or stylus is moved across the document such that the sequence of images track the movement of the pen or stylus while creating a stroke in the document, the method comprising:

locating at least three images in the sequence of images by decoding a portion of the maze pattern that is captured in each of the at least two images, and analyzing the decoded portions of the maze pattern in order to determine the positions in the document of the at least three images;

segmenting the stroke into a plurality of segments according to a plurality of pivotal points, such that a start point and end point of each segment are defined by two of the pivotal points, respectively, where the plurality pivotal points are determined positions of located images corresponding to:

a place where the stroke begins, a place where the stroke ends, and at least one place where the stroke makes a significant change in direction;

sorting the sequence of images into groups, each group corresponding to one of the segments of the stroke, each group comprising:

two of the located images corresponding to pivotal points, and at least one image in the sequence of images corresponding to at least one intermediate position of the corresponding segment;

for each group, determining if the corresponding segment is unfinished by determining whether the at least one intermediate position of the corresponding segment corresponds to at least one image whose position in the document has not previously been determined; and for each unfinished segment, using the determined position corresponding to at least one of the start and end positions to determine the position in the document of the at least one image whose position in the document has not previously been determined, wherein the document includes text obscuring a portion of the maze pattern before the pen or stylus is moved across the document, the obscured portion of the maze pattern being captured within the at least one image whose position in the document has not previously been determined of an unfinished segment.

16. The method according to claim 15, wherein the stroke is segmented by:

defining a single segment corresponding to the entire stroke such that the start and end points of the single segment are the pivotal points where the stroke begins and ends, respectively;

of the pivotal points between the start and end points of the single segment, choosing the one furthest from a line intersecting the start and end points of the single segment; and dividing the single segment into first and second segments by designating the start point and the chosen pivotal point of the single segment as the start and end points, respectively, of the first segment, and designating the pivotal and end points of the particular segment as the start and end points, respectively, of the second segment.

17. The method according to claim 15, wherein each of the plurality of images is a multiple pixel image.

* * * * *